United States Patent [19]
Thomson

[11] 3,938,319
[45] Feb. 17, 1976

[54] METHOD OF AND APPARATUS FOR PREVENTING COMPRESSOR STALL IN A GAS TURBINE ENGINE

[75] Inventor: Faulkner C. Thomson, Camp Springs, Md.

[73] Assignee: The United States of America as represented by the Secretary of the Navy, Washington, D.C.

[22] Filed: Aug. 13, 1974

[21] Appl. No.: 497,017

[52] U.S. Cl......... 60/39.03; 60/39.28 R; 73/407 PR; 73/115
[51] Int. Cl.² .......................................... F02C 9/08
[58] Field of Search........, 60/39.29, 39.28 R, 39.03; 73/407 PR, 115; 137/15.1, 15.2; 415/27, 28

[56] References Cited
UNITED STATES PATENTS

| | | | |
|---|---|---|---|
| 2,740,295 | 4/1956 | Perchonok | 73/407 PR |
| 2,792,685 | 5/1957 | Constantino | 73/407 PR |
| 2,910,870 | 11/1959 | Schaefer | 73/407 PR |
| 2,926,524 | 3/1960 | Sanders | 60/39.29 UX |
| 3,460,554 | 8/1969 | Johnson | 137/15.2 |
| 3,646,600 | 2/1972 | Bier | 73/407 PR |

*Primary Examiner*—Clarence R. Gordon
*Attorney, Agent, or Firm*—R. S. Sciascia; R. F. Beers; P. Schneider

[57] ABSTRACT

A method of and apparatus for detecting air distortion at the inlet of a gas turbine engine and adjusting fuel flow to anticipate and prevent compressor stall. A plurality of pressure taps are arranged in a spaced relation around the periphery of the engine inlet. A distortion detector senses the differential pressure between the instantaneous pressure at each pressure tap and the ambient pressure of a reference pressure chamber which communicates with the plurality of pressure taps. At a predetermined pressure differential the distortion detector activates a solenoid-operated fuel bypass valve which reduces fuel flow to the fuel nozzles of the gas turbine engine.

5 Claims, 1 Drawing Figure

U.S. Patent    Feb 17, 1976    3,938,319
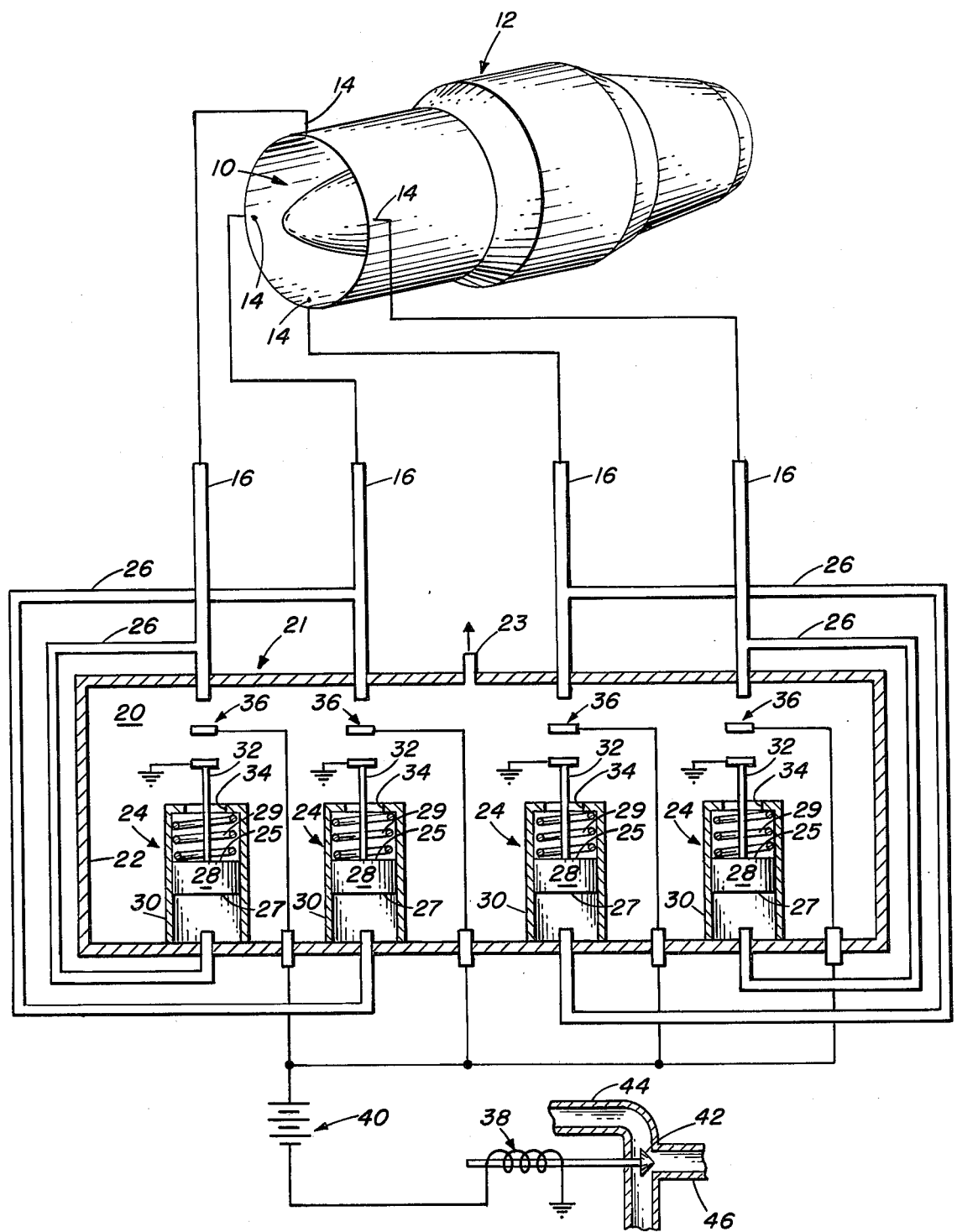

_3,938,319_

METHOD OF AND APPARATUS FOR PREVENTING COMPRESSOR STALL IN A GAS TURBINE ENGINE

STATEMENT OF GOVERNMENT INTEREST

The invention described herein may be manufactured and used by or for the Government of the United States of America for government purposes without the payment of any royalties theron or therefor.

BACKGROUND OF THE INVENTION

The present invention relates to a safety device for gas turbine engines and more particularly to an improved method of and apparatus for anticipatory detection and prevention of compressor stall caused by air inlet distortion.

Axial and centrifugal compressors in gas turbine engines for aircraft are susceptible to a stall condition which occurs when the pressure ratio across one or more stages of the compressor becomes too great. Stall is manifested by either a serious reduction or a reversal of air flow through the compressor and consequent reduction or complete loss of power. Occasionally, a rigorous aircraft maneuver such as a rapidly accelerating climbing turn causes severe air distortion at the engine inlet resulting in the onset of a compressor stall condition. An important factor to be considered in avoiding an impending stall is the lead time necessary to detect and commence corrective measures. Since prior art devices typically detect the onset of stall by sensing in-situ pressure conditions at or rearwardly of the compressor stages, valuable time may be lost in restoring the gas turbine engine to a stable operating condition.

SUMMARY OF THE INVENTION

The above limitation of prior stall prevention systems is overcome by the present invention which provides a novel and improved method of and apparatus for detection of air inlet distortion and the earliest anticipation of the stall condition caused by such distortion. The invention is based on the discovery that compressor stall occasionally results from distortion of air flow at the inlet of a gas turbine engine, particularly during acceleration transitions of high performance military aircraft powered by such engines. According to the present invention, a plurality of pressure taps are located around the periphery of the engine air inlet. Each tap transmits the local pressure to a distortion detector which senses any imbalance of air pressure between a reference pressure and the local pressure. At a predetermined pressure differential between the reference pressure and the local pressure at any one of the pressure taps an electrical circuit is energized to operate a fuel bypass valve which reduces the fuel flow to the engine thereby averting compressor stall. The term "reference pressure" as used in the specification and claims herein denotes a pressure proportional to the substantial equal pressures which exist at the gas turbine engine air inlet pressure taps when the aircraft is operating under the steady state conditions of level, constant velocity flight.

OBJECTS OF THE INVENTION

An object of the invention is to reduce the time lag between the occurrence of inlet air distortion sufficient to cause compressor stall and the initiation of corrective measures.

Another object of the invention is to detect as quickly as possible an impending stall condition caused by inlet air distortion in a gas turbine engine prior to the onset of stall in any portion of the compressor.

It is a further object of the invention to provide a simple and direct method of preventing compressor stall caused by air distortion at the inlet of a gas turbine engine.

Other objects, advantages and novel features of the invention will appear from a reading of the following detailed description of the invention when considered in conjunction with the accompanying drawing.

BRIEF DESCRIPTION OF THE DRAWING

The single FIGURE is a diagrammatic view of an embodiment of the present invention.

DETAILED DESCRIPTION OF THE INVENTION

Referring to the drawing, wherein like reference numerals represent like parts throughout, the inlet 10 of a gas turbine engine 12 is provided with four pressure sensors or taps 14 symetrically spaced around the inlet periphery. These taps 14 may be in the form of openings which communicate with conduits 16. Conduits 16 connect the pressure taps 14 to a reference pressure chamber 20 enclosed within the housing 22 of distortion detector 21. Four differential pressure sensors 24 are mounted within the chamber 20 on an internal wall of the housing 22. It will be apparent that the sensors 24 could be suitably arranged on an external wall of housing 22 directly connecting the walls 34 to form the chamber.

The inwardly disposed side of each sensor 24 communicates with the ambient pressure in the chamber 20 while the other side thereof communicates through an instantaneous pressure conduit 26 with an associated conduit 16 at a point upstream of the chamber 20. An exhaust conduit 23 is connected to chamber 20 and exhausts to atmospheric or other desired pressure. It should be noted that under steady state flight conditions, the pressures at the pressure taps 14 and in the conduits 16 are substantially equal. Further, the magnitude of the ambient or reference pressure in chamber 20 is proportional to the pressures at the pressure taps 14 and is dependent upon the air outflow through exhaust conduit 23. The cross-sectional area of conduit 23 is selected to provide sufficient air outflow from chamber 20 such that the reference pressure therein is less than the pressure at pressure taps 14 and in conduits 16, 26 over the inlet air pressure range in which compressor stall conditions are likely to occur. Preferably, the resulting steady-state differential pressure across the sensor 24 is maintained substantially constant over the aforementioned pressure range by appropriate and judicious selection of the size of conduit 23 and the volume of chamber 20.

Each differential pressure sensor 24 includes a piston 28 mounted for axial movement within a cylinder 30. A shaft 32 is axially affixed at one end to the face 25 of piston 28 and extends through an opening 34 in the inwardly projecting end of the cylinder 30. The opening 34 has a diameter appreciably greater that the diameter of shaft 32 so that face 25 of piston 28 senses the ambient pressure in chamber 20.

The other end of shaft 32 is arranged to close a switch 36 against the force of spring 29 when a predetermined magnitude of pressure differential exists across piston 28. The magnitude of the predetermined pressure differential necessary to compress spring 29 and close switch 36 is greater than the normal pressure differential resulting from the lower pressure in chamber 20 than in the conduit 26 and may be adjusted by varying the spring constant of spring 29. The switches 36 are electrically connected in parallel so that closing of any one of the switches will activate solenoid 38 from a power source 40. Solenoid 38 operates a fuel bypass valve 42 which, when opened, permits a portion of the fuel flow to the fuel nozzles (not shown) through conduit 44 to return via conduit 46 to the engine fuel pump inlet (not shown).

To illustrate the operation of the system, assume the invention is installed in a gas turbine engine of a high performance aircraft. Under the steady-state conditions of level, constant velocity flight, the system is in equilibrium, that is, the pressures at the four pressure taps 14 are substantially equal, the switches 36 are open and solenoid valve 42 is closed.

Now assume the pilot of the aircraft commences a maneuver such as, for example, a rapid acceleration into a climbing turn and air distortion sufficient to cause compressor stall occurs in the engine inlet. The air distortion will be exhibited as an increase in pressure at one or more of the pressure taps 14. This pressure increase will be transmitted through conduit 16 to chamber 20. The ambient pressure of chamber 20, however, will not increase appreciably since the chamber is vented to atmosphere through exhaust conduit 23. Instantaneous pressure conduit 26 transmits the pressure increase at tap 14 to the face 27 of piston 28 thereby increasing the pressure differential across the piston 28. When the increased pressure differential is sufficient to overcome the force of spring 29, i.e. reaches its predetermined value, piston 28 is urged upwardly to compress the spring 29. Switch 36 closes and completes the electrical circuit to energize solenoid 38 which, in turn, opens value 42 and diverts a portion of the fuel in conduit 44 into bypass conduit 46. It is to be understood that the signal generated by the distortion detector as evidenced by the movement of the piston 28 could be used to alter other operating conditions of the gas turbine engine, for example, opening either compressor bleeds or a variable area exhaust nozzle.

The present invention provides a novel and simple method of and apparatus for anticipatory detection of compressor stall caused by air distortion at the inlet of a gas turbine engine. The duration of the time interval between detection of the stall condition and onset of stall is appreciably increased by the practice of the present invention. This increased time interval permits more rapid initiation of corrective measures and, consequently, a greater margin of safety than possible with prior art stall control systems.

Modifications and variations of the present invention are possible in light of the above teachings and within the purview of the appended claims without departing from the spirit and scope of the invention.

What is claimed is:

1. In a gas turbine engine having a compressor and an air inlet, a compressor stall prevention system comprising:

a plurality total of pressure sensing means in said inlet for sensing the air pressure at spaced locations about the periphery of said inlet;

means connected to each of said pressure sensing means for producing a reference pressure proportional to the steady state pressure of said plurality of pressure sensing means;

means for sensing the pressure differential between said reference pressure and the pressure at each of said pressure sensing means;

means for generating a signal when said differential pressure exceeds a predetermined magnitude, said predetermined magnitude being indicative of air distortion in said inlet sufficient to cause compressor stall; and control means responsive to said signal for altering the operating conditions of said gas turbine engine to thereby prevent compressor stall.

2. The compressor stall prevention system of claim 1 wherein said control means includes means for reducing fuel flow to said gas turbine engine.

3. In a gas turbine engine having a compressor and an air inlet, a compressor stall prevention system comprising:

a plurality of pressure taps arranged in a spaced relation about the periphery of said air inlet;

air distortion detection means comprising;

a housing enclosing a reference pressure chamber;

a plurality of differential pressure sensors associated with said chamber and, arranged such that one side of each of said sensors communicates with the ambient pressure in said chamber;

a plurality of conduits corresponding in number to the number of pressure sensors, each one of said conduits individually connecting one of said pressure taps to the other side of one of said sensors; and an exhaust conduit connected to said housing and communicating with said chamber;

means connected to each of said differential pressure sensors for producing a signal when the pressure differential across any one of said sensors exceeds a predetermined magnitude, said predetermined magnitude being indicative of air distortion in said inlet sufficient to cause compressor stall; and control means responsive to said signal for reducing fuel flow to said gas turbine engine.

4. A method of anticipating and preventing compressor stall caused by air distortion in the air inlet of a gas turbine engine comprising the steps of:

sensing the total air pressure at a plurality of spaced locations about the periphery of said inlet;

producing a reference pressure proportional to the steady state pressure in said inlet;

generating a signal when the differential pressure between the pressure at any one of said spaced locations exceeds said reference pressure by a predetermined magnitude, said predetermined magnitude being indicative of air distortion in said inlet sufficient to cause compressor stall; and altering the operating conditions of said gas turbine engine in response to said signal to thereby prevent compressor stall.

5. The method of claim 4 wherein the step of altering the operating conditions of said gas turbine engine includes reducing the fuel flow to said engine.

* * * * *